United States Patent [19]

Chen

[11] 3,930,969

[45] Jan. 6, 1976

[54] PROCESS FOR OXIDIZING METAL SULFIDES TO ELEMENTAL SULFUR USING ACTIVATED CARBON

[75] Inventor: Tom P. Chen, Arvada, Colo.

[73] Assignee: Cyprus Metallurgical Processes Corporation, Los Angeles, Calif.

[22] Filed: June 28, 1974

[21] Appl. No.: 484,132

[52] U.S. Cl............ 204/105 R; 204/107; 204/111; 204/113; 204/117; 204/118; 204/122

[51] Int. Cl.² .............. C25C 1/00; C22B 9/08; C22B 15/08; C25C 1/20

[58] Field of Search ............ 204/105 R, 107, 111, 204/174–118, 122, 113, 123; 75/104, 75/117–121

[56] References Cited
UNITED STATES PATENTS

| | | | |
|---|---|---|---|
| 3,736,238 | 5/1973 | Kruesi et al.................. | 204/105 R |
| 3,767,543 | 10/1973 | Hazen.............................. | 204/52 R |
| 3,798,026 | 3/1974 | Milner et al. ..................... | 75/104 |

OTHER PUBLICATIONS

"Encyclopedia of Chemical Technology" by Kirk-Othmer, 2nd Ed., Vol. 4, 1964, p. 156.

*Primary Examiner*—R. L. Andrews
*Attorney, Agent, or Firm*—Sheridan, Ross & Fields

[57] ABSTRACT

Accelerated reaction rates and improved yields are accomplished when sulfides of metals of groups Ib, IIb, IVa, Va and VIII of the Periodic Table are oxidized in aqueous medium to convert the sulfide sulfur to elemental sulfur by performing the reaction in the presence of activated carbon.

30 Claims, No Drawings

PROCESS FOR OXIDIZING METAL SULFIDES TO ELEMENTAL SULFUR USING ACTIVATED CARBON

BACKGROUND OF THE INVENTION

1. Field of the Invention

This invention relates to the oxidation of metal sulfides and is particularly concerned with enhancing the oxidation reaction by performing it in the presence of activated carbon.

2. Prior Art

In present commercial methods for treating sulfide ores and concentrates the general practice involves smelting or roasting the sulfides through a complex series of roasting and smelting operations which drive off the sulfur as sulfur dioxide. The metal values are effectively recovered by these operations, however, large volumes of sulfur dioxide are produced which are not always conveniently recovered, resulting in serious air pollution problems. In an effort to overcome this sulfur dioxide problem, hydrometallurgical processes are being proposed which are designed to convert the sulfide to elemental sulfur and recover the corresponding metal.

The primary hydrometallurgical processes for these sulfides include electrolytic dissolution and chemical leaching. U.S. Pat. Nos. 3,673,061; 3,736,238 and 3,766,026 describe effective processes for electrolytic dissolution of sulfide concentrates, while chemical leaching processes are disclosed in U.S. Pat. No. 3,767,543 and in the U.S. Bureau of Mines, Report of Investigations 7474.

These hydrometallurgical processes are illustrative of approaches being made to permit economic recovery of metals from their sulfides without creating air pollution. In furthering these developments the herein disclosed invention enhances the operability and efficiency of these processes by increasing the reaction rates and improving the yields.

SUMMARY OF THE INVENTION

The oxidation of metal sulfides of metals of groups Ib, IIb, IVa, Va and VIII of the Periodic Table whereby the sulfides are converted to elemental sulfur and metal ions are put into aqueous solution is enhanced with regard to yield and reaction rate when performed in the presence of activated carbon. This technique is effective both with electrolytic dissolution of sulfides and with chemical leaching of the sulfides.

DESCRIPTION OF THE PREFERRED EMBODIMENTS

One particularly advantageous aspect of this invention is the fact that the known hydrometallurgical metal sulfide oxidation processes do not need to be altered with respect to their processing parameters. The only modification necessary is the addition of the activated carbon. Hence this development is readily adaptable to many processes now being contemplated.

The precise chemical explanation for the beneficial effect of the addition of activated carbon is not fully known, but it is observed that the activated carbon serves in a catalytic fashion in that the activated carbon may be fully recovered in unaltered form and reused.

The amount of activated carbon added to the reaction is not critical, however, if such a small proportion is added the reaction will not be substantially enhanced. It is therefore preferable to add at least about 2% by weight of the sulfide being treated, more preferably at least about 10% by weight of sulfide being treated, and most preferably about 20% by weight of the sulfide being treated. Higher amounts of activated carbon are of further benefit, but at some point the benefits become disproportionate to the amount of carbon being added.

The activated carbon may be added to the system in any convenient manner, and upon completion of the reaction may be recovered by common recovery means, such as by screening or by flotation. The recovered carbon may then be recycled for additional sulfide treating. The primary hydrometallurgical processes for oxidizing metal sulfides, chemical leaching and electrolysis, are both substantially improved by the inclusion of the activated carbon. The primary leaching processes utilize metal chloride leaching agents, particularly ferric chloride and cupric chloride. Other suitable leaching agents include chromic acid, manganic acid, and hydrogen peroxide. As before mentioned, the leaching need be carried out only by means already known in the art, as for example the process disclosed in the U.S. Bureau of Mines Publication Report of Investigation 7474 entitled "Recovering Elemental Sulfur from Non-Ferrous Minerals." Similarly, processes for electrolytic dissolution of metal sulfides known in the art, as for example, U.S. Pat. Nos. 3,736,238 and 3,673,061, may be employed directly without changing any processing parameters, electrolytes, etc.

Those metal sulfides particularly susceptible to this process include the group Ib metals of copper, silver and gold; the group IIb metals of zinc, cadmium and mercury; the group IVa metals of germanium, tin and lead; the group Va metals of arsenic, antimony and bismuth; and the group VIII metals of iron, cobalt, nickel, ruthenium, rhodium, palladium, osmium, iridium and platinum. These metal sulfides, of course, occur naturally in many different ores and ore bodies around the world.

A primary benefit resulting from the addition of activated carbon is an increase in the oxidation reaction rate. Also, the reactions are more efficient, in that for a given oxidative current or reactant a greater quantitative reaction occurs. An additional benefit is the fact that certain minerals and concentrates which are difficult to solubilize, for example enargite, pentlandite and chalcopyrite, are readily solubilized at high efficiency with the use of activated carbon. Furthermore, certain noble metals such as silver, gold and platinum which are difficult to dissolve are readily dissolved with the use of activated carbon, and once in solution these metals are readily adsorbed by the activated carbon, providing a means not only for recovery from the gangue but also their isolation from other metal values.

The aqueous oxidation of the metal sulfides with which this invention concerns proceeds with relative ease during the initial portion of the reaction and becomes increasingly more difficult as the reaction begins to approach completion. It is therefore often advantageous to permit the initial portion of the reaction to proceed in a conventional manner without the inclusion of activated carbon, and then introduce the activated carbon at that point during the course of the reaction when the relative difficulty begins to predominate. One manner of accomplishing this would be to perform the reaction in more than one stage, either cocurrently or countercurrently, and utilize the activated carbon in the final stage or possibly the last two stages. This would minimize the amount of activated carbon necessary and also facilitate recovery of the activated carbon. Preferably the reaction may be permitted to proceed conventionally to at least about 33% completion, more preferably to at least about 50% completion, and most preferably to at least about 66% completion prior to the addition of activated carbon.

The following examples are illustrative of the improvement in the oxidation reactions which the presence of activated carbon generates.

EXAMPLE 1

A commercial copper concentrate containing principally the mineral chalcopyrite was pre-leached with ferric chloride converting a substantial portion of the copper and iron into soluble form and the sulfide into sulfur. The residue from this pre-leach assayed: 18.32% copper, 22.26% iron, 12.5% elemental sulfur, and 39.8% total sulfur.

Equal samples from this residue were further leached with ferric chloride. The leachant assayed fabric ion 62.5 grams per liter and ferrous ion 49.2 g/l under the identical conditions of: 80°C temperature, 6 hours time, 0.5 pH and slurry density of 295 grams residue to 2 liters of leachant.

To one of the residue samples 59 grams of activated carbon was added (20% of residue dry weight), and the following results were noted:

|  | No Activated Carbon | Activated Carbon | % Improvement |
|---|---|---|---|
| Copper Dissolved | 18.56 gms | 25.79 gms | 39% |
| Fe Dissolved | 15.11 gms | 22.19 gms | 47% |
| gms Fe$^{+++}$/gm Cu Dissolved | 6.73 | 4.84 | 39% |
| Elemental S/Elemental S plus Sulfate Sulfur | 92.5% | 93.6% | 1.2% |

It is observed that substantially more copper and iron are dissolved in the presence of activated carbon than without it. The carbon improves the utilization of the ferric ion oxidant. More elemental sulfur is formed and less sulfur is oxidized to sulfate.

EXAMPLE 2

Two additional samples of the residue cited in Example 1 were oxidized in the anode compartment of an electrolytic cell as taught in U.S. Pat. No. 3,736,238. To one sample 60 grams (20% by weight) of activated carbon were added. The two samples were electro-oxidized under the following identical conditions: 120 ampere hours, 0.5 pH, 80°C temperature, anode current density of 120 amperes per square foot, a media of 2 molar ferrous chloride solution, and a slurry density of 300 grams residue to 2 liters of solution.

|  | Without Activated Carbon | With Activated Carbon | % Improvement |
|---|---|---|---|
| Copper Dissolved Grams | 37.91 | 39.60 | 4.3% |
| Ampere Hours Per Gram | 3.16 | 3.03 | 4.3% |

EXAMPLE 3

Two additional samples of the residue cited in Example 1 were used in leaches in which the lixiviant was a solution of cupric chloride. To one sample 20 grams of activated carbon was added. The leach conditions were identical and were: 80°C temperature, 0.5 pH, a media of 150 g/l ferrous ion as chloride, and 50 g/l cupric ion as chloride, time of 4 hours, and a slurry density of 100 grams of residue to 0.5 liters of solution.

|  | Without Activated Carbon | With Activated Carbon | % Improvement |
|---|---|---|---|
| Copper Dissolved Grams | 5.02 | 5.34 | 6.4% |
| Gms Cu$^{++}$/gms Cu Dissolved | 4.98 | 4.68 | 6.4% |

EXAMPLE 4

Samples of a commercial lead concentrate (containing principally galena) assaying 72% lead and 1.1% antimony were anodically dissolved in an electrolytic cell. Conditions used were: an anode current of 60 ampere hours, an anode current density of 60 ampere hours per square foot, 0.5 pH, 80°C temperature, a media of 4N sodium chloride, and a slurry density of 250 grams of concentrate to 2 liters of solution.

To one of the samples 50 grams of activated carbon was added with the following results:

|  | Without Activated Carbon | With Activated Carbon | % Improvement |
|---|---|---|---|
| Lead dissolved grams | 106.5 gms | 126.1 gms | 18.4% |
| % of Feed | 59.2% | 70.0% |  |
| Antimony dissolved gms | .64 gms | 1.1 gms | 71.9% |
| % of Feed | 23.6% | 40.6% |  |

Particularly noteworthy is the antimony results, as this sulfide is difficult to dissolve.

EXAMPLE 5

Samples of a commercial zinc-lead-silver concentrate which contained 23.6% Zn, 18% Pb, 0.017% Ag, 0.056% Cd, 0.039% Sb, 0.012% Bi, were anodically dissolved in an electrolytic cell. Conditions used were: an anode current of 60 ampere hours, an anode current density of 120 amperes per square foot, 0.5 pH, 75°C temperature, a media of 4N NaCl, and a slurry density of 200 grams of concentrate to 2 liters.

To one of the samples 10% by weight of residue (20 grams) of activated carbon was added, with the following results being noted:

|  | Without Activated Carbon | With Activated Carbon | % Improvement |
|---|---|---|---|
| Zinc Dissolved | 37.3 gms | 44.5 gms | 19.3% |
| % of Feed | 79% | 94.3% |  |
| Lead dissolved | 31.1 gms | 33.7 gms | 8.4% |
| % of feed | 86% | 93.6% |  |
| Ag dissolved | .031 gms | .033 gms | 6.5% |
| % of feed | 91.2% | 97.1% |  |
| Ag absorbed on charcoal% | — | 6.1% |  |
| Cadmium dissolved | .052 gms | .054 gms | 3.8% |
| % of feed | 72.2% | 75.0% |  |
| Antimony dissolved | .053 gms | .059 gms | 11.3% |
| % of feed | 68.0% | 75.6% |  |
| Bismuth dissolved | .019 gms | .0233 gms | 22.0% |
| % of feed | 79.2% | 97.1% |  |

A portion of the silver dissolved was found to be adsorbed by the activated carbon, providing a convenient means of separating the valuable silver from the other soluble ions.

EXAMPLE 6

Samples of a copper concentrate containing the mineral enargite and assaying 29.2% copper and 8.6% arsenic were anodically dissolved in an electrolytic cell. Conditions used were: 60 ampere hours, anode current density of 120 amperes per square foot, 0.5 pH, 75°C temperature, a media of 4N NaCl, and a slurry density of 391.6 grams of concentrate to 2 liters of solution.

To one sample 39.2 gms (10%) activated carbon was added:

|  | Without Activated Carbon | With activated Carbon | % Improvement |
|---|---|---|---|
| Copper dissolved | 26.21 gms | 31.46 gms | 74.5% |
| % of feed | 22.9% | 27.5% |  |
| As dissolved | 2.55 gms | 3.81 gms | 49.4% |
| % of feed | 7.5% | 11.2% |  |

EXAMPLE 7

Samples of a nickel-cobalt sulfide concentrate were anodically dissolved in an electrolytic cell. These concentrates contained 7.3% nickel and 0.2% cobalt. Conditions used were: anode current of 35 ampere hours, anode current density of 30 amperes per square foot, 75°C temperature, 0.5 pH, a media of 4N NaCl, and a slurry density of 325 grams of concentrate to 3 liters of solution.

To one of the samples 32.5 grams (10%) of activated carbon was added.

|  | Without Activated Carbon | With Activated Carbon | % Improvement |
|---|---|---|---|
| Nickel dissolved | 10.97 gms | 16.78 gms | 53.0% |
| % of feed | 46.3% | 70.7% |  |
| Cobalt dissolved | 0.23 gms | 0.38 gms | 65.2% |
| % of feed | 35.3% | 58.4% |  |

EXAMPLE 8

Samples of the same concentrate used in Example 7 were subjected to a ferric chloride leach. Leach conditions were: 90°C temperature, time of 8 hours, 0.5 pH, a media of 120 grams per liter ferric ion, and a slurry density of 200 grams of concentrate to one liter of solution.

To one of the samples 10 grams (5%) of activated carbon was added.

|  | Without Activated Carbon | With Activated Carbon | % Improvement |
|---|---|---|---|
| Nickel dissolved | 10.65 gms | 12.94 gms | 21.5% |
| % of feed | 73.0% | 88.6% |  |
| Cobalt dissolved | .32 gms | .388 gms | 21.3% |
| % of feed | 80.4% | 97.0% |  |

EXAMPLE 9

A nickel, cobalt, copper, iron matte containing platinum and palladium was electro-oxidized in the anode compartment of an electrolytic cell. 400 grams of the matte were subjected to 80 ampere hours of current. The matte contained 0.0641 grams of platinum and 0.0364 grams of palladium. 15 grams of activated carbon had been added. While no platinum or palladium were found in the anolyte solution, 0.0115 grams of platinum, and 0.0078 grams of palladium were found to have been adsorbed by the activated carbon. In a similar electro-dissolution study with this feed, in which 400 grams of the feed were subjected to 92.5 ampere hours, no platinum or palladium were found to be dissolved without activated carbon.

EXAMPLE 10

Samples of a chalcopyrite residue containing gold and silver and assaying 0.075% copper, 0.32 oz/ton gold and 8.0 oz/ton Ag were subjected to anodic attack in an electrolytic cell. Conditions were: an anode durrent of 12.5 ampere hours, an anode current density of 12.5 amperes per square foot, 80°C temperature, 0.5 pH, and a media of 4N NaCl.

To one of the samples 20 grams (5%) of activated carbon was added.

|  | Without Activated Carbon | With Activated Carbon |
| --- | --- | --- |
| Copper % of feed dissolved | 20% | 36.7% |
| Gold % dissolved | 0% | 13.6% |
| Silver % dissolved | 43.2% | 43.7% |

Gold and silver were found adsorbed by the activated carbon. This illustrates the dissolution of these noble metals in the presence of activated carbon and the separation from the solution and other ions by adsorption by the activated carbon.

What is claimed is:

1. In a chemical leach reaction process wherein metal sulfides selected from the group consisting of sulfides of metals of groups Ib, IIb, IVa, Va and VIII of the Periodic Table are subjected to a reaction with an aqueous medium of a temperature of at least 50°C wherein the sulfide sulfur is oxidized to elemental sulfur, and the metal values are solubilized, the improvement comprising performing the leach reaction in the presence of at least about 2% by weight of the metal sulfides being treated of activated carbon.
2. The process of claim 1 wherein the chemical leaching agent is ferric chloride.
3. The process of claim 1 wherein the chemical leaching agent is cupric chloride.
4. The process of claim 1 wherein the metal sulfide is copper sulfide.
5. The process of claim 1 wherein the metal sulfide is silver sulfide.
6. The process of claim 1 wherein the metal sulfide is gold sulfide.
7. The process of claim 1 wherein the metal sulfide is zinc sulfide.
8. The process of claim 1 wherein the metal sulfide is cadmium sulfide.
9. The process of claim 1 wherein the metal sulfide is mercury sulfide.
10. The process of claim 1 wherein the metal sulfide is germanium sulfide.
11. The process of claim 1 wherein the metal sulfide is tin sulfide.
12. The process of claim 1 wherein the metal sulfide is lead sulfide.
13. The process of claim 1 wherein the metal sulfide is arsenic sulfide.
14. The process of claim 1 wherein the metal sulfide is antimony sulfide.
15. The process of claim 1 wherein the metal sulfide is bismuth sulfide.
16. The process of claim 1 wherein the metal sulfide is iron sulfide.
17. The process of claim 1 wherein the metal sulfide is cobalt sulfide.
18. The process of claim 1 wherein the metal sulfide is nickel sulfide.
19. The process of claim 1 wherein the metal sulfide is ruthenium sulfide.
20. The process of claim 1 wherein the metal sulfide is rhodium sulfide.
21. The process of claim 1 wherein the metal sulfide is palladium sulfide.
22. The process of claim 1 wherein the metal sulfide is osmium sulfide.
23. The process of claim 1 wherein the metal sulfide is iridium sulfide.
24. The process of claim 1 wherein the metal sulfide is platinum sulfide.
25. In a chemical leach reaction process wherein metal sulfides selected from the group consisting of sulfides of metals of groups Ib, IIb, IVa, Va and VIII of the Periodic Table are subjected to a reaction in an aqueous medium at a temperature of at least 50°C wherein the sulfide is oxidized to elemental sulfur, and the metal values are solubilized the improvement comprising performing the initial portion of the chemical leach reaction in a conventional manner, and performing the subsequent portion of the chemical leach reaction in the presence of at least about 2% by weight of the metal sulfides being treated of activated carbon.
26. In a chemical leach reaction process wherein metal sulfides selected from the group consisting of sulfides of metals of groups Ib, IIb, IVa, Va and VIII of the Periodic Table are subjected to a reaction in an aqueous medium at a temperature of at least 50°C wherein the sulfide is oxidized to elemental sulfur and wherein at least one of the metal sulfides consists of a noble metal sulfide and the metal values are solubilized, the improvement comprising performing the chemical leach reaction in the presence of at least 2% by weight of the metal sulfides being treated of activated carbon and adsorbing the noble metal by the activated carbon.
27. An electrolytic process wherein metal sulfides selected from the group consisting of sulfides of metals of groups Ib, IIb, IVa, Va and VIII of the Periodic Table are subjected to a reaction in an aqueous medium wherein the sulfide sulfur is oxidized to elemental sulfur, comprising:
   a. providing an electrolyte in an electrolytic cell including at least an anode compartment and a cathode compartment separated by a diaphragm, the electrolyte comprising an acidic aqueous solution of at least one chloride salt selected from the group consisting of aluminum, chromium, copper, iron, manganese, nickel, zinc, and rare earth metals, and mixtures thereof, the solution having a concentration from about 0.5 N to saturation;
   b. mixing with the electrolyte a solid feed sulfide of the metal having an average particle size smaller than about 60 mesh U.S. Standard;
   c. maintaining the temperature of the electrolyte media at about 50° to 105°C., and the pH of the electrolyte media below about 3.9 while introducing electric current into the electrolytic cell to provide an anode current density above about 12 amperes per square foot to dissociate the metal sulfide into metal ions and elemental sulfur;
   d. performing the electrolytic dissociation in the presence of activated carbon; and
   e. recovering metal from the electrolyte.

28. The process of claim 27 wherein the metal sulfide is copper sulfide.

29. The process of claim 27 wherein the electrolyte comprises ferric chloride.

30. The process of claim 27 wherein the electrolyte comprises cupric chloride.

* * * * *